US009456716B2

(12) United States Patent
Fragniere

(10) Patent No.: US 9,456,716 B2
(45) Date of Patent: Oct. 4, 2016

(54) BEVERAGE PREPARATION MACHINE WITH AUTOMATIC CLEANING SYSTEM

(75) Inventor: Frédéric Fragniere, Chavornay (CH)

(73) Assignee: Nestec S.A., Vevey (CH)

( * ) Notice: Subject to any disclaimer, the term of this patent is extended or adjusted under 35 U.S.C. 154(b) by 423 days.

(21) Appl. No.: 13/991,800

(22) PCT Filed: Dec. 5, 2011

(86) PCT No.: PCT/EP2011/071783
§ 371 (c)(1),
(2), (4) Date: Jun. 5, 2013

(87) PCT Pub. No.: WO2012/076483
PCT Pub. Date: Jun. 14, 2012

(65) Prior Publication Data
US 2013/0287914 A1    Oct. 31, 2013

(30) Foreign Application Priority Data
Dec. 6, 2010  (EP) .................................... 10193797

(51) Int. Cl.
*A47J 31/60* (2006.01)
*A47J 31/36* (2006.01)
*B08B 9/043* (2006.01)

(52) U.S. Cl.
CPC .............. *A47J 31/60* (2013.01); *A47J 31/3695* (2013.01); *B08B 9/0436* (2013.01)

(58) Field of Classification Search
CPC .... A47J 31/3695; A47J 31/60; B08B 9/0436
See application file for complete search history.

(56) References Cited

U.S. PATENT DOCUMENTS

| 2,018,086 A | * | 10/1935 | Parsons .................... A46B 7/10 15/164 |
| 3,599,557 A | | 8/1971 | Leal |
| 5,753,297 A | | 5/1998 | Schmed |
| 2012/0285485 A1 | * | 11/2012 | Majeed .................. A61B 1/122 134/8 |

FOREIGN PATENT DOCUMENTS

| CN | 2107305 | | 6/1992 |
| DE | 19522025 | | 12/1996 |
| DE | 19522025 A1 | * | 12/1996 |
| EP | 2071986 | | 6/2009 |
| JP | H07171825 | | 7/1995 |
| WO | 2008092734 | | 8/2008 |
| WO | 2009027131 | | 3/2009 |
| WO | 2010044116 | | 4/2010 |

OTHER PUBLICATIONS

Japanese Office Action for Application No. P2013-541383, Dispatch No. 452753, dated Oct. 6, 2015, 11 pages.

* cited by examiner

*Primary Examiner* — Jianying Atkisson
(74) *Attorney, Agent, or Firm* — K&L Gates LLP

(57) ABSTRACT

The invention concerns a beverage preparation system (1) for preparing a beverage by injection of a liquid into an ingredient capsule, the beverage system comprising an ingredient capsule (54) and a beverage preparation machine (2, 200) having:—an injection unit (73; 204) with at least one inner through channel (75; 210) for injecting a liquid into the ingredient capsule;—operating means for causing the machine to prepare a beverage, characterized in that the machine further comprises a cleaning device (90; 220) for automatically cleaning said at least one inner through channel, said cleaning device being actuated by said operating means.

14 Claims, 4 Drawing Sheets

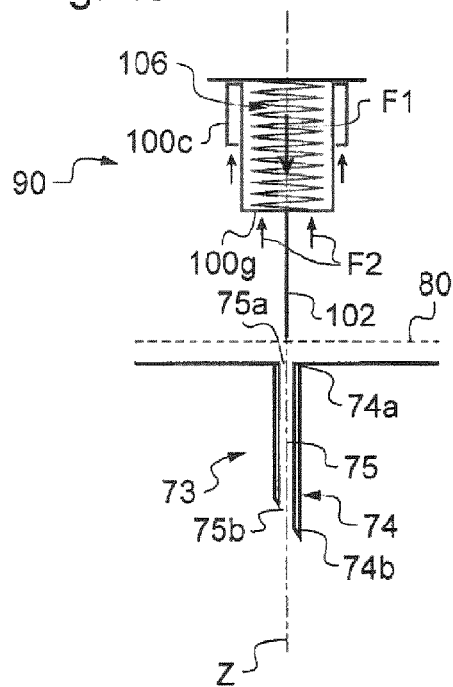
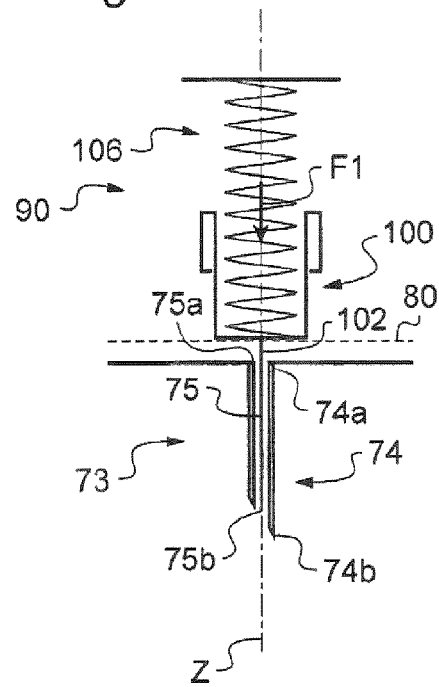
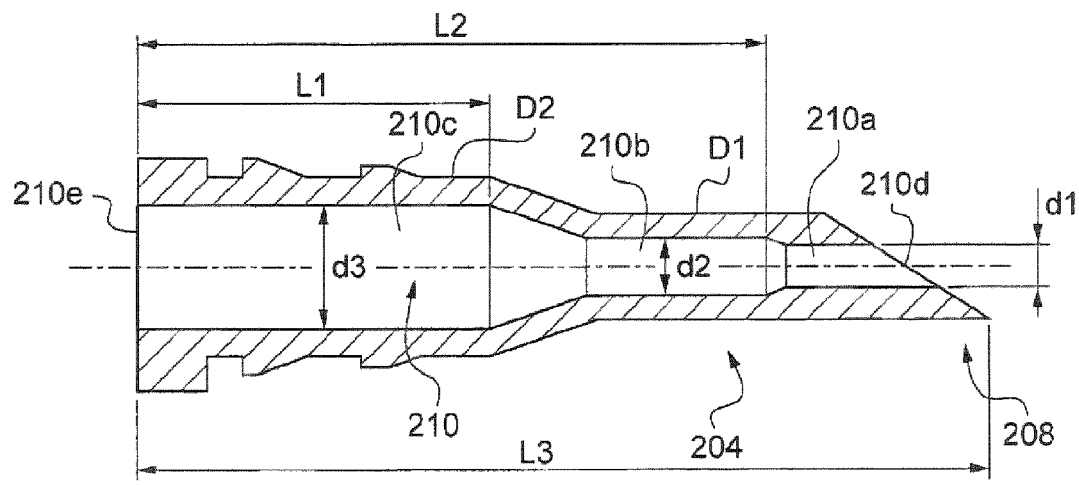
Fig. 6

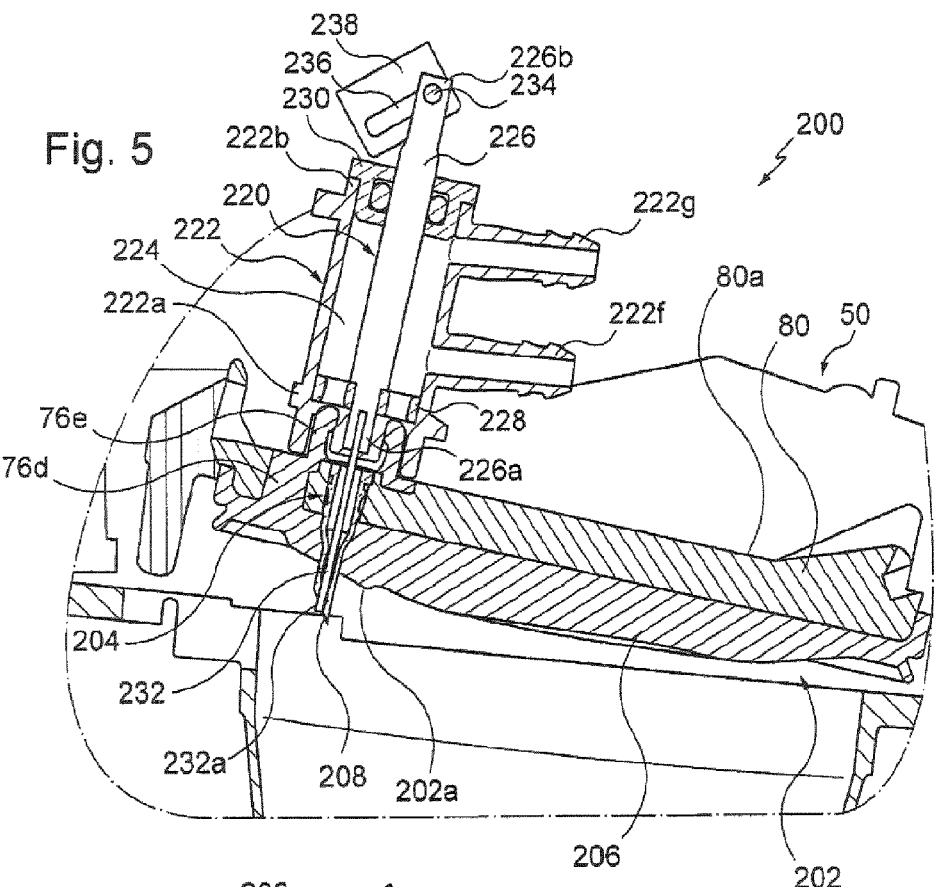

BEVERAGE PREPARATION MACHINE WITH AUTOMATIC CLEANING SYSTEM

CROSS REFERENCE TO RELATED APPLICATIONS

The present application is a National Stage of International Application No. PCT/EP2011/071783, filed on Dec. 5, 2011, which claims priority to European Patent Application No. 10193797.7, filed Dec. 6, 2010, the entire contents of which are being incorporated herein by reference.

FIELD OF THE INVENTION

The present invention concerns a beverage system including a beverage preparation machine for preparing a beverage by injection of a liquid into an ingredient capsule.

BACKGROUND OF THE INVENTION

An ingredient capsule contains food ingredients or substances that are used by addition of a liquid for preparing a beverage or, to a larger extent, liquid comestibles.

A beverage preparation machine comprises a receptacle for accommodating a capsule and a fluid injection system for injecting a fluid, preferably a liquid such as water, under pressure into said capsule. For instance, water injected under pressure in the capsule, for the preparation of a coffee beverage, is preferably hot, that is to say at a temperature above 70° C. However, in some particular instances, water might also be at ambient temperature. The pressure inside the capsule during extraction and/or dissolution of the capsule ingredient(s) is typically about 1 to 6 bar for dissolution products, and 2 to 12 bar for extraction of roasted and grounded coffee. Such a preparation process greatly differs from the so-called "brewing" process of beverage preparation—particularly for tea and coffee, in that brewing requires a long time of infusion of the ingredient(s) by a fluid (e.g. hot water), whereas the beverage preparation process allows a consumer to prepare a beverage, for example coffee, within a few seconds.

The principle of extracting and/or dissolving the ingredient(s) of a closed capsule under pressure is known and consists typically of inserting the capsule into a receptacle of a machine, injecting a quantity of pressurized water into the capsule, so as to create a pressurized environment inside the capsule either to extract the ingredient(s) or dissolve it, and then release the extracted ingredient(s) or the dissolved ingredient(s) through the capsule. Capsules of this type have already been described for example in the Applicant's European patents 1 472 156 B1, and 1 784 344 B1.

Machines operating in accordance with this principle have already been described for example in documents CH 605 293 and EP 242 556. According to these documents, a beverage preparation machine comprises a receptacle for accommodating a capsule and a piercing and injection element made in the form of a hollow needle comprising in its distal region one or more liquid injection orifices. The hollow needle has a dual function in that it pierces and therefore opens the top portion of the capsule on the one hand, and forms through inlet channel inside the needle enabling water to flow through to the distal region the capsule for being injected thereinto on the other hand.

When the beverage to be prepared is coffee, a capsule may contain roast and ground coffee powder as an ingredient, which is to be extracted thanks to hot water injected therein.

Capsules have been developed for such an application, which are disclosed in the Applicant's European patent EP 1 784 344 B1, and European patent application EP 2 062 831.

In short, a capsule of this type typically comprises:
- a hollow body and an injection wall which is impermeable to liquids and to air and which is attached to the body at the top end of the capsule and adapted to be punctured by e.g. an injection needle of the machine;
- a chamber containing a bed of roast and ground coffee to be extracted;
- an aluminium membrane disposed at the bottom end of the capsule for closing said capsule and maintaining the internal pressure within the chamber, said membrane being associated with perforating means for forming dispensing holes in the membrane when said internal pressure within the chamber reaches a certain predetermined value,
- optionally, means configured to break the jet of water so as to reduce the speed of the jet of water injected into the capsule and distribute water across the bed of substance at a reduced speed.

As the beverage preparation machine of the above-described kind uses water as extraction fluid scaling deposits are formed in the parts of the machine which are in contact with water that is the water circulation system.

These scaling deposits get accumulated in the parts of the water circulation system over time along with the use of the machine.

This may lead through inlet channel of the needle that is used for injecting water into the pierced capsule to be clogged with time.

Users of these machines are asked to regularly clean the water circulation system with a descaling or anti-scaling product in order to avoid clogging of the system and in particular of the needle.

However, as the diameter of the channel internal to the needle is narrow it is particularly favourable to scaling.

In order to deal with this problem the existing machines are equipped with a cleaning tool which takes the form of a pin-shaped member.

This pin-shaped member has an outside diameter which corresponds to the internal diameter of the needle channel taking account of the mechanical tolerance.

Machines' user guide provides consumers with instructions as to how regularly use this cleaning tool in order to avoid scaling and therefore subsequent clogging of the machines.

Users are instructed to introduce the pin-shaped member into the needle channel by an end thereof (the end by which water is supplied to the channel) through the opposite end in order to rub the inner wall of the channel and therefore remove any scaling deposits.

Although technically satisfactory, such a manual operation requires the user to regularly plan the cleaning, which is not satisfactory. Furthermore, in case the user omits the regular descaling maintenance, this may result in clogging of the needle, such that it then necessitates to send the machine to an after-sales service, which is of course undesirable.

SUMMARY OF THE INVENTION

According to a first aspect, the invention concerns a beverage preparation system for preparing a beverage by injection of a liquid into an ingredient capsule, the beverage system comprising an ingredient capsule and a beverage preparation machine having:

an injection unit with at least one inner through channel for injecting a liquid into the ingredient capsule;

operating means for causing the machine to prepare a beverage, characterized in that the machine further comprises a cleaning device for automatically cleaning said at least one inner through channel, said cleaning device being actuated by said operating means.

The system is conceived so that cleaning of the at least one inner through channel is automatically operated, i.e. without any human intervention dedicated to cleaning.

The only human intervention is that one necessary for operating the beverage preparation machine with a view to preparing a beverage.

It is to be noted that cleaning the at least one inner through channel means cleaning the internal surface of the wall that delimits the inner through channel and on which deposits may get accumulated.

According to one feature, the cleaning device has an elongated cleaning member, actuation of said cleaning device causing said elongated cleaning member to slide within the at least one inner through channel. The sliding movement of the elongated cleaning member within the at least one inner through channel makes it possible to remove any deposits that may get accumulated on the internal surface of the wall surrounding said channel.

Thus, the cleaning operation is automatically triggered when operating means for causing the beverage preparation machine to prepare a beverage are actuated.

The present invention suppresses human intervention for cleaning the injection unit and, therefore, makes cleaning more regular and more reliable than in the past.

Furthermore, the cleaning device does not use any additional energy source for being operated.

In addition, the cleaning device does not modify the current operation of the beverage preparation machine for preparing beverages. It is just easily and conveniently interfaced with the current mechanism of the machine.

It is to be noted that the injection unit may be traversed by several inner channels and, correspondingly, the cleaning device may include several elongated cleaning members each being intended to be inserted in a channel for cleaning thereof.

According to one feature, the elongated cleaning member is able to automatically occupy two positions, a first active position in which said elongated cleaning member extends within the at least one inner through channel through to the free emerging end thereof, and a second rest position in which said elongated cleaning member is at least partly withdrawn from said at least one inner through channel.

Thus, actuation of the cleaning device causes the elongated cleaning member to occupy either of the two positions depending on the position of said elongated cleaning member when starting actuation of the cleaning device.

For instance, before actuating the operating means of the machine the elongated cleaning member may be in the first active position and will move to the second rest position upon actuation of said operating means.

Alternatively, the starting position of the elongated cleaning member may be the second rest position before actuating the operating means.

According to one feature, the at least one inner through channel comprises at least two channel portions, a first channel portion including the free emerging end of said at least one inner through channel and having a first inner diameter, and at least one upstream channel portion disposed upstream said first channel portion and having an enlarged second inner diameter. The first channel portion has preferably a reduced diameter which is suitable for producing a jet of liquid when exiting the free emerging end of the channel.

In order to avoid increasing the risks of scaling deposits formation within the channel the upstream channel portion (e.g. second channel portion) has preferably an enlarged inner diameter.

According to another feature, the at least one inner through channel may further comprise a third channel portion disposed upstream a second channel portion and having an enlarged third inner diameter.

It is to be noted that the length of the first channel portion must be sufficient to produce a jet of liquid but must not be too long in order to avoid augmenting the risks of scaling deposits accumulation inside.

Having three different channel portions with three successive different inner diameters instead of one may be useful to avoid a sharp increase in inner diameter within the channel.

Also, this intermediary channel portion of intermediary diameter makes it possible to have a thinner outer size for the injection unit close to the free emerging end of the channel, which is more favourable to the piercing (or puncturing or tearing, etc) of an ingredient capsule.

This is because having only two channel portions will render the outer size of the injection unit proximate the free emerging end of the channel wider and, therefore, less favourable to the piercing operation.

According to another feature, the elongated cleaning member has a free extremity which, in the second rest position, is located in the at least upstream channel portion (e.g. a second channel portion).

Alternatively, in case the at least one inner through channel has three channel portions, then the free extremity of the elongated cleaning member may be, in the second rest position, located in the third channel portion.

When the free extremity of the elongated cleaning member is located in the upstream channel portion (either the second or the third one) this leaves sufficient room between said elongated cleaning member and the surrounding wall of the channel portion to enable circulation of liquid therebetween as well as in the first channel portion.

Thus, partly withdrawing the elongated cleaning member from the inner through channel (the elongated cleaning member is fully withdrawn from the first channel portion) makes it possible to enable circulation of liquid within the whole channel through to the free emerging end thereof for being injected into an ingredient capsule.

According to another feature, the elongated cleaning member has an outside diameter which substantially fits the first inner diameter of the first channel portion while enabling sliding of said elongated cleaning member thereinto.

Thus, the transverse dimension of the elongated cleaning member (e.g. its diameter) is adjusted to the first inner diameter of the first channel portion for efficiently cleaning the surface of the internal wall defining this channel portion thanks to a sliding movement within said channel portion.

In the configuration of an inner through channel broken up into several channel portions, the risks of clogging of the channel portions may arise, in particular, in the portion of reduced diameter, that is the first channel portion.

The other upstream located channel portions are less prone to clogging.

According to a first embodiment, said operating means comprise actuation means for actuating the machine from a first open position in which said machine is open for enabling introduction of the ingredient capsule thereinto to a second closed position in which said machine is closed and the ingredient capsule is inside said machine for liquid injection, and vice versa, said cleaning device being actuated by said actuation means. Thus, the mere actuation of the opening/closing mechanism of the beverage preparation machine makes it possible to actuate the cleaning device and, therefore, the cleaning operation associated therewith.

According to this embodiment, cleaning takes place when opening the machine for introducing an ingredient capsule thereinto and after the beverage has been prepared, when opening the machine again for removing the used ingredient capsule.

Thus, cleaning takes place twice every cycle of use of the beverage preparation machine.

This embodiment is advantageous in that cleaning is merely triggered when opening and/or closing the machine.

As an example, in the first open position of the machine the injection unit may be in a high position and in the second closed position the injection unit may be in a low position.

The injection unit is therefore moved from a high to a low position when closing the machine or from a low to a high position when opening the latter.

According to another feature, the elongated cleaning member and the injection unit are movable relative to one another when the machine is actuated from the first open position to the second closed position and vice versa. Thus, when actuating the machine from one position to the other position the elongated cleaning member and the injection unit are movable relative to one another so that the elongated cleaning member may slide within the at least one inner through channel.

Furthermore, it is to be noted that the elongated cleaning member and the injection unit are connected to a part of the beverage preparation machine (e.g. the extraction head) which is movable between the first open position and the second closed position.

According to one feature depending from the latter feature, the cleaning device has a support member to which the elongated cleaning member is connected, said support member being movable relative to the injection unit over a reduced path so that the elongated cleaning member is only withdrawn in part from said at least one inner through channel in its second position.

This arrangement is advantageous in that a small displacement of the support member and the elongated cleaning member with respect to the injection unit is sufficient to enable efficient cleaning of the at least one inner through channel through a sliding movement.

Such a reduced displacement necessitates fewer space, which, therefore, does not enlarge the outer dimensions of the machine.

More particularly, this arrangement is made possible since in the second position of the elongated cleaning member its free extremity is located in an upstream channel portion enabling passage of liquid through to the free emerging end of the inner through channel and, therefore, injection of said liquid into the ingredient capsule.

According to another feature, the support member has two opposed ends, one end being connected to the elongated cleaning member and the other opposed end being linked with guiding means which are connected to the machine, said other opposed end being slidably guided over said reduced path when the machine is actuated from the first open position to the second closed position, and vice versa.

The support member is therefore guided by its opposed end over a reduced path which is defined by two stops which are disposed at the opposed ends of a guiding rail or slot.

According to another embodiment, the beverage preparation machine has:
a liquid source
a pump for pumping said liquid from said liquid source towards the injection unit,
activating means for causing said liquid to be pumped from said source towards said injection unit, said cleaning device being actuated by said activating means.

Thus, cleaning may automatically take place based on the actuation by liquid pumped from the liquid source towards the injection unit.

This self-cleaning operation is made possible every cycle of beverage preparation by use of the pressure of the liquid that is pumped and injected into the capsule.

The injection of liquid through the at least one inner channel into the capsule makes it possible to move back the elongated cleaning member from its first active position to its second rest position.

When liquid is no longer injected into the capsule and therefore the liquid pressure is very low, the elongated cleaning member is then automatically urged to be more deeply re-inserted into the at least one inner through channel without any human intervention.

This reciprocating motion of the elongated cleaning member enables rubbing of the inner surface of the wall of the at least one inner channel and, therefore, removal of any deposits (e.g. scaling deposits when the liquid is water) that may get accumulated on the surface of the wall.

As has already been mentioned above, the transverse dimension of the elongated cleaning member (e.g. a pin) roughly corresponds to the inner diameter of the at least one inner through channel in its narrower portion taking account of the mechanical clearance.

According to an embodiment, the injection unit is a piercing and injection unit that includes a piercing or puncturing member for piercing or puncturing an ingredient capsule, the at least one inner through channel being formed in said piercing or puncturing member. Liquid is therefore injected into the capsule after piercing or puncturing thereof.

According to one feature, the elongated cleaning member is able to automatically occupy said two positions depending on the injection or not of liquid into the at least one inner through channel, said elongated cleaning member being in said first active position in the absence of liquid injection thereinto, said elongated cleaning member being in said second active position due to the pressure of liquid injected into the at least one inner through channel. The elongated cleaning member is in either position according to the actuation of liquid injection or not.

According to one feature, the cleaning device includes active means for exerting upon the elongated cleaning a first predetermined force (F1) so as to urge said elongated cleaning member to be inserted into the at least one inner through channel with a view to occupying the first active position.

These active means, e.g. resilient means, are permanently integrated in the machine so as to permanently exert the first predetermined force on the elongated cleaning member whatever the status of operation of the liquid injection process, thereby meaning that the liquid may be in the course of injection or not.

In contrast, the liquid pressure does not always act on the elongated cleaning member.

Thus, the elongated cleaning member tends to be inserted into the at least one inner through channel out of mere conception of the cleaning device.

According to one feature, the elongated cleaning member is able to be pushed backwards under the action of the pressure of the liquid to be injected into the at least one inner through channel and which counteracts the first predetermined force so that the elongated cleaning member is at least partly withdrawn from said at least one inner through channel.

Thus, when the liquid is circulated under pressure within the liquid circulation system of the machine, e.g. thanks to a pump, and brought near the inlet of the at least one inner through channel, the liquid pressure acts on the cleaning device member (e.g. to which the elongated cleaning member is connected) to counteract the first predetermined force and push back the elongated cleaning member to its rest position.

More particularly, the liquid pressure applies a second force to the cleaning device that is greater in intensity than the first one and opposed in direction.

According to one feature, the cleaning device comprises a support member to which the elongated cleaning member is connected.

According to one feature, the support member has a substantially cylindrical shape that is elongated along a longitudinal axis (Z), the support member being closed at one end by a transverse element, the elongated cleaning member being connected to said transverse element and extending therefrom outwards.

The shape of the support member is particularly simple.

The elongated cleaning member may releasably be connected to the support member or be an integral part thereof.

According to one feature, the support member is open at the opposed end and has an inner housing in communication with the open end for receiving active means.

The cleaning device thus configured is compact.

The active means may be partially or fully received within the housing.

According to another feature, the beverage preparation machine includes a hollow elongated casing for accommodating therein the cleaning device, said cleaning device being slidable within the casing for occupying the two positions, said casing having at least one inlet opening and at least one outlet opening, said at least one inlet opening enabling liquid to be introduced in the casing before being injected into the at least one inner through channel through at least one outlet opening.

The cleaning device is thus protected within the casing.

The cleaning device and the at least one inlet opening are configured so that liquid under pressure may be introduced into the casing through said at least one inlet opening and applied against a surface of the support member with a view to longitudinally sliding it within the casing from its active to its rest position, thereby freeing the at least one inner through channel.

According to one feature, the beverage preparation machine includes a capsule-holder for holding the ingredient capsule.

According to one feature, the capsule-holder is in a releasable connection with the beverage preparation machine.

The ingredient capsule may be placed in the capsule-holder before introducing the latter in the machine.

Alternatively, the capsule-holder may be located within the machine and the ingredient capsule is introduced in the machine either directly into the capsule-holder or indirectly, that is the capsule-holder is moved from a first position to a second position to engage with the introduced capsule upon activation of a mechanism.

According to a second aspect, the invention concerns a cleaning device that is intended to be integrated in a beverage system of the above described type.

More particularly, the invention concerns an assembly comprising a channel in which a liquid temporarily flows and a cleaning device for cleaning said channel, said cleaning device including:
- a support member;
- an elongated cleaning member connected to the support member and that is suitable for being inserted into the channel for cleaning thereof;
- said support member and elongated cleaning member being movable in a forward direction under the action of a predetermined force so as to be urged to occupy a first active position in which said elongated cleaning member extends within the channel through to the free emerging end thereof, said support member and elongated cleaning member being movable in a backward direction under the action of an opposed predetermined force so as to be urged to occupy a second rest position in which said elongated cleaning member is at least partly withdrawn from said channel.

The invention also concerns a cleaning device for cleaning a channel in which a liquid temporarily flows, said cleaning device including:
- a support member;
- an elongated cleaning member connected to the support member and that is suitable for being inserted into the channel for cleaning thereof; said support member and elongated cleaning member being movable in a forward direction under the action of a predetermined force so as to be urged to occupy a first active position in which said elongated cleaning member extends within the channel through to the free emerging end thereof, said support member and elongated cleaning member being movable in a backward direction under the action of an opposed predetermined force so as to be urged to occupy a second rest position in which said elongated cleaning member is at least partly withdrawn from said channel.

According to another feature, the cleaning device, either of the assembly or alone, includes active means for exerting upon the support member a first predetermined force urging the elongated cleaning member to occupy the first active position in the absence of liquid within the channel, whereas said elongated cleaning member is urged to be at least partly withdrawn from the channel under the action of a second greater opposing predetermined force resulting from the pressure of a liquid to be injected into the channel and acting on the support member.

Such a cleaning device is able to occupy two distinct positions depending on the injection of liquid into the channel or not.

For example, the first force is along a longitudinal axis as well as the second force.

According to one feature, the active means are resilient means, e.g. spring means.

The support member may therefore be resiliently mounted, e.g. spring-mounted.

According to one feature, the support member has a substantially cylindrical shape that is elongated along a longitudinal axis (Z), the support member being closed at one end by a transverse element, the elongated cleaning member being connected to said transverse element and extending therefrom outwards.

According to one feature, the transverse element has two opposite faces, an inner face being disposed inside the support member and submitted to the action of the first predetermined force (F1) exerted by the active means, and an outer face being disposed outside the support member and submitted to the second greater opposing predetermined force (F2) when liquid is injected into the channel.

According to a third aspect, the invention concerns a method for preparing a beverage with a beverage preparation machine by injection of a liquid into an ingredient capsule, said machine comprising an injection unit with at least one inner through channel for injecting a liquid into the ingredient capsule, the method including the steps of:

providing an ingredient capsule;
operating the machine for causing said machine to prepare a beverage, characterized in that said method further comprises the step of cleaning the at least one inner through channel, said cleaning step being automatically initiated when the operating step for operating the machine is performed.

Thus, automatic cleaning is operated at every cycle of normal use of the machine, i.e. without any specific human intervention for cleaning purpose.

When a user decides to operate the beverage preparation machine for preparing a beverage cleaning is automatically initiated.

In a non limitative way, operating the machine may comprise two steps or actions.

According to a first step or action, said operating step for operating the machine includes an actuating step for actuating the machine from a first open position in which said machine is open for enabling introduction of the ingredient capsule thereinto to a second closed position in which said machine is closed and the ingredient capsule is inside said machine for liquid injection, and vice versa.

As has already been mentioned above, opening or closing the beverage preparation machine triggers the cleaning operation for cleaning the at least one inner through channel of the injection unit.

Thus, cleaning takes place every time the machine moves from the first position to a second position, and vice versa.

Also, the machine comprises a liquid source and a pump, the method further includes a step of injecting liquid into the ingredient capsule through said at least one inner through channel, said automatically cleaning step being performed before and/or during and/or after the injection of liquid. Thus, cleaning may occur in an automated manner at any time in relation to the injection of liquid, that is before and/or during and/or after the injection of liquid.

Operating the machine for preparing a beverage may also comprise a second step or action of activating pumping of liquid for causing said liquid to be pumped from said liquid source towards the injection unit, said automatically cleaning step being performed when said activating step is performed.

This activation of the machine takes place after the machine has been actuated, i.e. moved from a closed position to an open position for inserting an ingredient capsule thereinto and then from said open position to a closed position.

If the machine is already open, actuation of the machine means moving the latter from its open to a closed position after inserting an ingredient capsule.

Here, the user activates the preparation of a beverage by activating a mechanism (e.g. he/she may press a button, handle a lever, etc.).

The cleaning is performed using the cycle of injection of liquid into a capsule and the following cycle where injection stops (and pressure of the liquid decreases down to zero).

In an embodiment, the method further includes piercing or puncturing the ingredient capsule with a piercing or puncturing member, said at least one inner through channel being formed within said piercing or puncturing member.

The principle, here, is to form an aperture or an hole (or several ones) into the closed ingredient capsule (e.g. in a wall closing the capsule) whatever the means used for.

The injection is then made into the pierced or punctured ingredient capsule through the formed aperture or hole.

BRIEF DESCRIPTION OF THE DRAWINGS

Additional features and advantages of the present invention are described in, and will be apparent from, the description of the presently preferred embodiments which are set out below with reference to the drawings in which:

FIGS. 4a and 4b are two schematic views of two respective positions of a cleaning device according to the invention and that is represented in FIG. 3;

FIG. 6 is a schematic view of a needle element;

FIGS. 5 and 7 are respectively schematic views of the extraction head of a beverage preparation machine according to another embodiment of the invention in an open and a closed position.

DETAILED DESCRIPTION OF THE INVENTION

Figure 1:
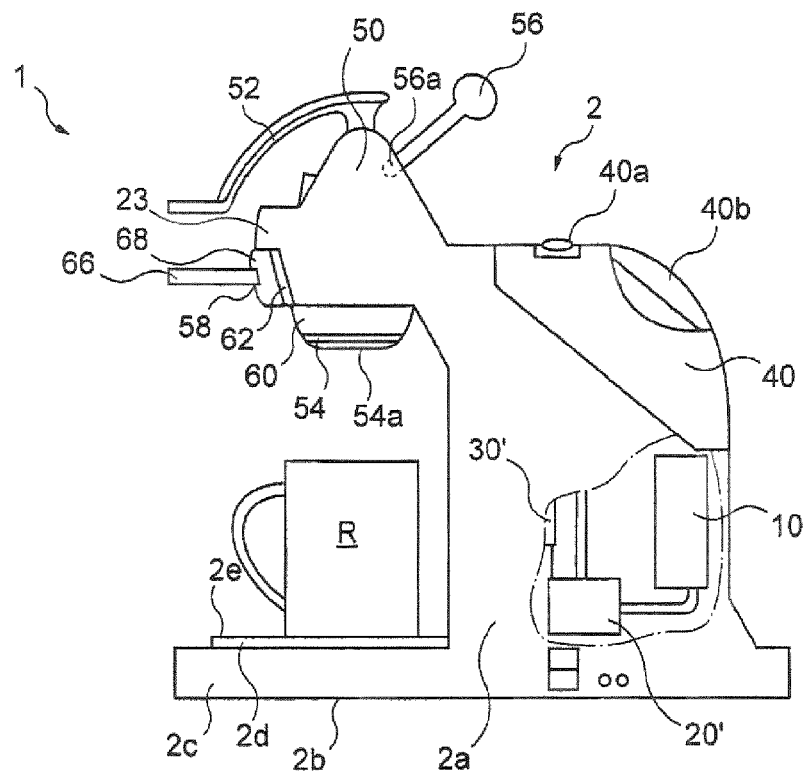
FIG. 1 is a schematic side view of a beverage system and beverage preparation machine according to an embodiment of the invention.

FIG. 1 shows a side view of a beverage system 1 including a beverage preparation machine 2 according to the present invention. The machine 2 comprises a housing 2a containing at least a heater 10, a pump 20 and control means 30. Further the machine comprises a reservoir 40 connected to the machine, an extraction head 50 and a base portion 2b which is preferably provided with feet for positioning the machine on a support (e.g. table) in a stable manner. The machine further comprises a stand 2c for a receptacle R, such as a cup, having an upper surface 2d provided with a grid 2e on which the receptacle is positioned. The reservoir 40 supplies liquid such as water to the heater 10 and the pump 20, and hence to the extraction head 50 of the machine 2 through a liquid circulation system. Preferably, the reservoir 40 is connected to the machine in a detachable manner and has an inlet 40a for introducing liquid. It is preferably provided with a handhold 40b for facilitating the handling of the reservoir 40. Thus a user handles the reservoir 40 in a convenient way. An outlet (not represented in the drawings) which is preferably situated at the bottom of the reservoir 40 provides a connection between the reservoir 40 and the machine 2.

It is to be noted that, in addition to the integrated reservoir 40 or as an alternative, an external water supply may be provided.

The extraction head 50 of the machine comprises a closing mechanism 52 for selectively enclosing an ingredient capsule 54 provided to the machine and a control lever 56 for selectively supplying either cold or hot water to the extraction head 50 and hence to the capsule 54. In this connection, the control lever 56 is connected at least to the control means 30 of the machine 2. Hence, the control lever 56 may be switched over from a neutral position to a first position selecting hot water or to a second position selecting cold water. This selection may be easily achieved by moving the control lever 56 to the left or to the right when seen in front-rear direction of the machine 2. Accordingly, a user can decide and therefore select whether to supply cold or hot water to the capsule provided to the machine in order to prepare a cold or hot beverage.

As can be seen in FIG. 1, a capsule-holder 58 comprising holding means 60 for holding the ingredient capsule 54 is inserted into an aperture 62 of the extraction head 50 for being received in a receiving chamber 64 (not shown in FIG. 1) of the extraction head 50. The capsule-holder is therefore releasably connected to the machine. The aperture 62 for accessing the receiving chamber 64 is located at the front side of the extraction head. The holding means 60 for receiving the capsule 54 are designed such that a beverage delivery portion 54a, e.g. an outlet port, of the capsule 54 is not enclosed in the holding means.

When introducing liquid into the capsule 54, a self-opening lower face opens in the capsule due to the pressure rise within the capsule 54 and hence supplies the beverage for example to the receptacle R placed below the capsule 54. Furthermore, a handhold 66 is connected to the capsule-holder 58 in order to enable a convenient handling of the capsule-holder 58. Furthermore, the capsule-holder 58 is fitted with a front cover 68, which covers the aperture 62 when the capsule-holder 58 is inserted into said aperture.

Figure 2:
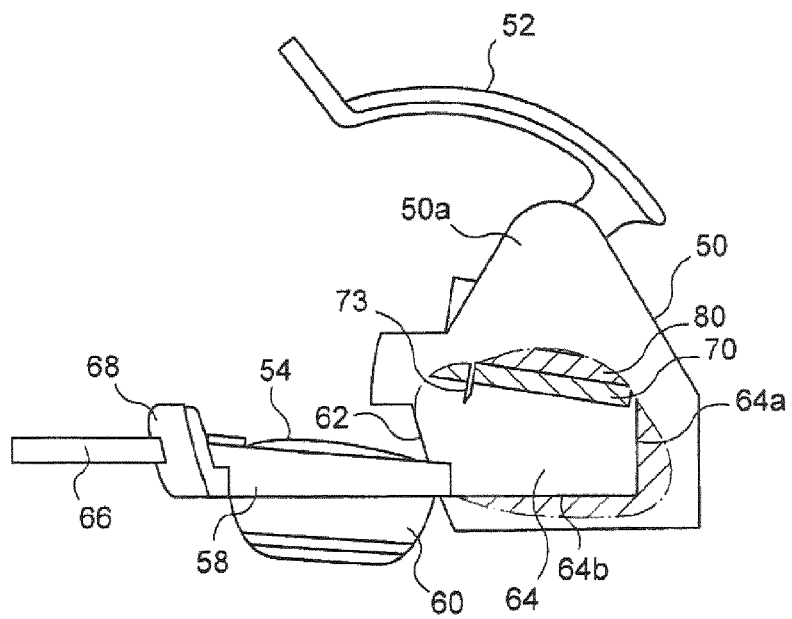
FIG. 2 is a schematic side view of the extraction head of FIG. 1 with a capsule held by a capsule-holder before being inserted into the extraction head.

As schematically illustrated in FIG. 2, the extraction head 50 comprises an injection member 70 and a support 80 connected therebetween, both being located inside the extraction head. The connection between injection member 70 and support 80 may be made in a known manner through a connection mechanism e.g. as described in EP 2 071 988 A1 which is hereby incorporated by reference.

The closing mechanism 52 enables a relative movement between the support 80 and a rear wall 64a of the receiving chamber 64. The support 80 is connected from below to a dome-shaped member 50a of the extraction head. When the closing mechanism 52 is activated by a user and lowered, the support 80 is lowered from an elevated or high open position (illustrated in FIG. 2) towards guiding recesses 84b provided inside the extraction head 50. Such guiding recesses 64b are designed to guide the capsule-holder when slidably inserted into the receiving chamber 64 and to hold said capsule-holder 58 in a correct position within the receiving chamber 64. Thus, the capsule 54 held by the capsule-holder 53 may be efficiently enclosed within the receiving chamber 64 thanks to the closing mechanism 52.

Figure 3:
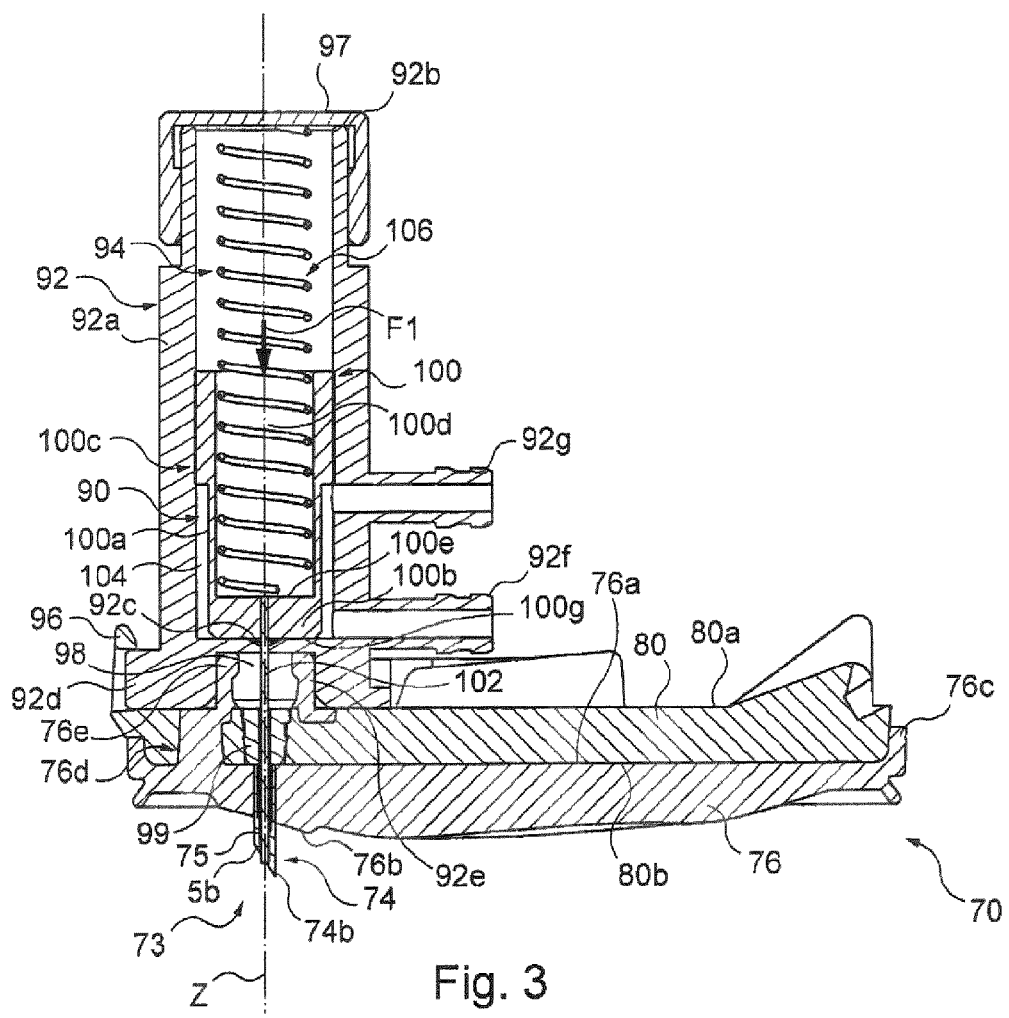
FIG. 3 is a schematic cross-section of an assembly according to the invention that is part of the extraction head of FIG. 2.

FIG. 3 illustrates an enlarged section view of injection member 70 and support 80 of FIG. 2.

As represented in FIG. 3, injection member 70 includes a piercing and injection unit 73 which has a piercing or puncturing member 74 for piercing or puncturing the ingredient capsule 54 (see FIG. 2) as described in applicant's European patent EP 1 967 100 B1. The member 74 is a needle made from stainless steel, or ceramic material.

Piercing and injection unit 73 further has at least one inner through channel 75 which extends from an inlet orifice 75a, corresponding to one end 74a of the piercing member, to an outlet orifice 75b corresponding to the opposite end 74b which is designed to carry out the piercing or puncturing function.

The channel is used for injecting a liquid that is supplied to the extraction head 50 by pump 20, such as water, into the ingredient capsule 54 after piercing. The liquid is introduced at the inlet orifice 75a and flows within the channel through to the outlet orifice 75b which is in communication with the interior of the capsule (not visible in FIG. 3).

Piercing and injection unit 73 such as described above is more specifically represented in FIGS. 4a and 4b and for example takes the form of a needle element. The needle element is preferably made of stainless steel. Needle element has been force-it into a traversing hole of a base plate 76 so as to be flush mounted on the upper horizontal face 76a of said base plate and protrude from the lower face 76b.

It is to be noted that the injection unit 73 does not necessarily pierce an ingredient capsule but may fit through an aperture or an inlet port provided in the capsule. In this respect, injection unit 73 which carries out the injection function only may take other forms. Alternatively, the capsule may be pierced by any other means and injection unit 73 which may here also take other forms only carries out the injection function.

Base plate 76 is e.g. substantially disc-shaped. Base plate 76 has for example a substantially inverted U shape in the longitudinal cross-section illustrated in FIG. 3. The inverted U shape is defined by a peripheral surrounding edge 76c that delimits together with upper face 76a an inner recess.

Support 80 includes a support plate which is located within into the inner recess. For example, injection member may be made of a rubber-based material and molded onto support plate 80 (e.g. by injection molding). As can be seen in FIG. 3, support plate 80 is located above base plate 76 and may be connected to the extraction head 50 of FIG. 2 in a manner that is not represented in the drawings.

Base plate 76 also includes a raising portion 76d axially extending along a longitudinal axis Z from upper face 76a, near the traversing hole where needle element 73 is engaged.

Raising portion 76d further extends transversely from its upper end through a substantially ring-shaped extending portion 76e that is arranged concentrically around the longitudinal axis Z passing by the needle element traversing hole, at a distance from upper face 76a.

As can be seen in FIG. 3, ring-shaped extending portion 76e is fixed at one end to raising portion 76d upper end and is free at its opposed end. Ring-shaped extending portion 76e has a tight-sealing function.

The machine further includes a cleaning device 90 which is located facing the injection member 70 and the needle element. In the illustrated embodiment cleaning device 90 arranged is above the needle element and accommodated in a hollow casing 92 that is in contact with support plate 80. More particularly, the casing is secured to the upper face 80a of support plate 80 while lower face 80b thereof is in contact with upper face 76a of base plate 76.

Casing 92 has a shape that is elongated along longitudinal axis Z and concentrically arranged around said axis Z passing by the needle element traversing hole.

Casing 92 is substantially cylindrical in shape but other forms may be envisaged.

Casing 92 has a body 92a surrounding an internal elongated cavity 94 that is open at one upper end 92b of the casing for inserting there through cleaning device 90. A closing member 97, e.g. a cap, is mounted in a secured and releasable manner on the upper end casing so as to close it temporarily.

The casing has at one opposed lower end a small opening 92c compared to the large upper opening 92b.

Casing 92 also has a base portion 92d which extends both axially and transversely from its body 92a, thereby forming a shoulder.

As schematically represented, the base portion shoulder is engaged under one or several resilient retaining members 96 which raise from the periphery of upper face 80a and inwardly project therefrom. Casing 92 is therefore firmly retained in position against upper face 80a.

Furthermore, a central inner recess 92e is provided in base portion 92d from underneath.

This recess is centred about the opening 92c and is in communication therewith.

The inner dimensions of recess 92e fit with the outer dimensions of protruding portion 8e so that the latter may be tightly engaged or snapped into the recess.

Before inserting protruding portion 76e into recess 92e of casing 92 a plug member 98 is snapped or force-fit into the central aperture of ring-shaped protruding portion 76e from underneath. This plug member carries out a liquid-tight function and also has an inner through duct in its central portion. The inner through duct is aligned with the inner through channel 75 of needle element 73.

Before arranging support plate 80 within recess of base plate 76 a guiding member 99 is inserted into a hole which traverses support plate 80 in its whole thickness.

Guiding member 99 has a through central duct which is in alignment with the inner through channel 75 of needle element 73 and inner through duct of plug member 98 when support plate 80 is accommodated within the base plate recess. Guiding member 99 is substantially cylindrical in shape for example.

Casing 92 is also provided with at least one inlet opening enabling introduction of liquid under pressure into internal cavity 94. In the embodiment illustrated in FIG. 3, casing 92 is provided with two distinct inlet openings 92f and 92g which each take the form of ducts protruding outwardly from the wall constituting body 92a. The ducts 92f and 92g emerge through the wall into internal cavity 94.

As depicted in FIG. 3, both ducts are located on the same side of the casing above the central portion of support plate 80 so as not to increase the overall size of the assembly (injection member 70 and support plate 80 with casing 92).

Further, one of the ducts is arranged above the other. One of the ducts is used for hot liquid (e.g. water) whereas the other is used for liquid (e.g. water) at ambient temperature. These ducts are in communication with pump 70 through a liquid circulation system.

Cleaning device 90 includes a support member 100 that is movable along longitudinal axis Z between two main positions as schematically illustrated in FIG. 4a and FIG. 4b. More particularly, support member is slidable within internal elongated cavity 94. Cleaning device 90 also includes an elongated cleaning member 102 that is connected to support member 100 and therefore moves with the latter.

Elongated cleaning member 102 may be releasably connected to support member or permanently secured thereto by one end, the opposite end being free.

Elongated cleaning member 102 may, for instance, take the form of a pin.

Elongated cleaning member 102 has a shape and outer dimensions which respectively fit the shape and internal dimensions (e.g. internal diameter) of the inner channel 75.

Thus, cleaning member 102 is able to follow a back and forth motion within channel 75 in the course of use of the machine for cleaning purpose.

It is to be noted that the shape and outer dimensions of cleaning member 102 also respectively fit the shape and internal dimensions of plug member 98 and guiding member 99 so as to facilitate the sliding movement of cleaning member 102.

In particular, guiding member 99 longitudinally guides cleaning member 102 during its sliding movement within channel 75.

Support member 100 has a substantially cylindrical outer shape whose dimensions tightly fit the dimensions of internal cavity 94 for sliding purpose.

Support member 100 includes a body portion 100a axially extending from a supporting element or base portion 100b that is transverse to the axial direction of extension and forms a closed end of the support member (lower end).

In the embodiment of FIG. 3 the axial extension is along longitudinal axis Z which is vertical. However, other geometrical arrangements of the FIG. 3 assembly (injection member 70 and cleaning device 90) may be envisaged. For instance, longitudinal axis Z may be horizontal or inclined between horizontal and vertical directions.

The elongated cleaning member 102 has an end that is secured to supporting element 100b. This end may be force-fit into a hole formed in supporting transverse element 100b.

Body portion 100a radially or transversely extends at a distance from supporting transverse element 100b, while keeping on axially extending until reaching the opposed open end (upper end) of the support member.

The radial or transverse extension forms a shoulder 100c (that is a transverse element) which therefore frees spacing 104 between the inner face of body wall 92a and the part of body portion 100a that is located below the shoulder. This part of body portion 100a has a narrower transverse dimension than shoulder 100c.

In this example, spacing 104 takes the form of an annular cylindrical portion.

As represented in FIG. 3, in the lowest position of the support member the shoulder 100c (transverse element) is located above the emerging highest duct 92g.

This arrangement is made to ensure that liquid introduced through inlet duct 92g will always communicate with spacing 104 whatever the support member position.

The elongated body portion 100a of support member is hollow and has an inner housing 100d.

Inner housing 100d is bordered at one end (lower end) by the inner face 100e of supporting transverse element 100b and open at the opposite end (upper end) so as to be in communication with internal cavity 94.

Housing 100d is for example cylindrically-shaped.

The cleaning device 90 further includes active means which permanently exert a first predetermined force F1 on support member 100.

This force F1 is exerted in a direction which is along longitudinal axis Z and here is downwardly oriented as illustrated in FIGS. 3, 4a and 4b.

The active means are preferably resilient means, such as spring means 106 in the drawings. However, other active means playing the same role may be alternatively used. For instance, pneumatic means or injection means which are suitable for injecting a fluid under pressure within housing 100d may be envisaged.

Such a fluid may be water extracted from reservoir 40.

In the FIG. 3 embodiment spring means 106 are secured by one end to the inner face 100e and by the opposed end to the inner face of the closing member 97.

In the position illustrated in FIG. 3 the first permanent force F1 exerted on inner face 100e is not compensated by any opposing force in the absence of injection liquid (e.g. water).

Thus, the support member 100 is urged to occupy its lowest position (see also FIG. 4b), thereby urging elongated cleaning member 102 to be inserted into channel 75 for cleaning purpose (first active position).

It is to be noted that the length of cleaning member 102 has to be sized appropriately to be able to reach the outlet orifice 75b in FIGS. 3 and 4b.

However, when a user operates the beverage preparation machine after inserting an ingredient capsule into the machine the closing mechanism 52 of the extraction head 50 has to be brought into a closed position in order to lower the assembly comprising support 80 and injection member 70 and close the machine. The user then activates the machine by pressing an activation button or member and/or manipulating the control lever 56 and/or through any other activating or actuation means. Liquid, e.g. water, is then put into circulation within the liquid circulation system of the machine thanks to pump 20 which pumps liquid from the liquid source or reservoir 40. Liquid is thus brought to one of the two ducts 92f and 92g according to the user choice (hot or ambient temperature beverage).

Liquid under pressure is then introduced into spacing 104 (FIG. 3) and fills it.

When spacing 104 is thus filled and liquid keeps on flowing from the inlet duct, the pressure of the liquid within the spacing increases and, in particular, acts on the transverse element formed by shoulder 100c, thereby lifting support member 100.

The liquid pressure is high enough to counteract the first predetermined force F1 and push support member 100 upwardly.

When the outer face 100g of supporting transverse element 100b that is opposed to the inner face 100e is separated from outlet opening 92c pressure liquid also applies against outer face 100g and contributes to move support member 100 towards its rest position (FIG. 4a).

As represented in FIG. 4a, liquid pressure acts both on outer face 100g and shoulder 100c and is schematically represented by the opposing force F2 (longitudinally directed). Force F2 is greater than force F1.

In the course of support member 100 longitudinal movement elongated cleaning member 102 is progressively withdrawn from inner through channel 75. This withdrawal makes it possible for cleaning member 102 to rub against the inner surface of channel 75.

When cleaning member 102 is fully removed from channel 75 and outlet opening 92c, liquid (e.g. water) is introduced in the latter and the successive ducts of members 98 and 99 before reaching channel 75 for being then injected into the ingredient capsule that is not represented in the drawings.

As shown in FIG. 4a, in the rest position cleaning member 102 is maintained out of channel 75 through liquid pressure which compresses spring means 106 thanks to greater force F2.

When liquid injection is stopped (end of the machine operation), liquid pressure rapidly decreases, thereby enabling first predetermined force F1 to exceed the force due to liquid pressure. Support member 100 is then moved downwardly under the action of force F1 (FIG. 4b) and cleaning member 102 is pushed into channel 75 through to exit orifice 75b.

During the sliding movement within channel 75 cleaning member 102 comes into contact with the inner surface thereof and is thus able to remove any possible deposits, debris (e.g. scaling deposits) which may get accumulated inside the channel.

In the position illustrated in FIG. 4b cleaning member 102 has reached exit orifice 75b and will remain inside the channel until next operation of the machine. This provides an additional advantage in that no deposit can be formed within the channel due to the presence of cleaning member when the machine is at rest.

In FIGS. 4a and 4b, support 80 has been schematically depicted by dotted lines for the sake of clarity.

Further appropriate sealing means (not represented in the drawings) may be used in order to prevent any leakage of the liquid between the different parts of the assembly represented in FIG. 3.

Another embodiment of a beverage preparation machine 200 and a system associated therewith will now be described with reference to FIGS. 5 to 7.

The above description made in relation to FIGS. 1 and 2 remains applicable and will not be repeated here.

The numeral references pertaining to FIGS. 1 and 2 are kept for the same elements which are taken over here, except for injection member 70 and cleaning device 90 which have been modified.

FIG. 5 illustrates an enlarged partial section view of the interior of the extraction head 50 of FIG. 2, when the latter is in an open high position. In this position the beverage preparation machine is open for enabling an ingredient capsule to be introduced through the aperture 62 (FIG. 2). FIG. 7 illustrates the closed position of the machine.

As illustrated in FIG. 5, the modified injection member 202 is connected to support 80 in the same manner as that described above for injection member 70 and support 80.

Injection member includes a piercing and injection unit 204 which extends over the whole thickness of the assembled injection base plate 206 and support plate 80.

Piercing and injection unit 204 has a piercing member 208 for piercing an ingredient capsule such as capsule 54 in FIG. 2.

The function of the piercing member 208 is to form a hole or aperture (or several ones) in a wall of the capsule so that this hole will enable injection of liquid into said capsule. This hole or aperture (or these holes) may be formed by any other means such as puncturing, tearing means or the like (these remarks also apply to the embodiment described with reference to FIGS. 1 to 4b).

Also, the unit 204 may alternately not necessarily be used to form a hole or aperture into an ingredient capsule but may fit through a hole or aperture or an inlet port already provided for in said capsule.

Under these circumstances, injection unit 204 which carries out the injection function only may take other forms (conduit, pipe, nozzle, etc).

Alternatively, the capsule may be pierced, punctured, torn, etc. by any other distinct means and injection unit 204 which may here also take other forms only performs the injection function.

Piercing and injection unit 204 also has at least one inner through channel 210 which is used for injecting a liquid that is supplied to the extraction head 50 by pump 20 into the ingredient capsule after piercing.

FIG. 6 represents in detail a cross-section of unit 204 which, here, for example takes the form of a needle element.

As illustrated, unit 204 (needle element) comprises three channel portions 210a-c which break up channel 210 into:

- a first channel portion 210a which includes the free emerging end 210d of channel 210 through which liquid leaves said channel and enters the ingredient capsule (liquid is ejected from free end 210d (outlet orifice) under the form of a jet due to the small diameter d1 of first channel portion 210a); the length of first channel portion has to be as small as possible, in particular for reducing the risks of clogging;
- a second intermediary channel portion 210b which is arranged upstream first channel portion 210a and has an enlarged second inner diameter d2; the length of second channel portion 210b is greater than that of first channel portion 210a and the outer diameter D1 of unit 204 remains the same along first and channel portions 210a and 210b;
- a third channel portion 210c which is arranged upstream second channel portion 210b and includes the opposite end 210c of the channel where is located the inlet orifice through which liquid penetrates into the channel; this third portion has an enlarged inner third diameter d3 and an enlarged outer diameter D2, and a length that is greater than that of second channel portion.

The outer diameter D1 of unit 204 proximate its free emerging end is small enough and the length of this member over which this diameter is kept is long enough to efficiently form a hole or aperture in the wall of an ingredient capsule through piercing, puncturing, or the like. If there was no second intermediary channel portion and just the third channel portion the outer diameter of the piercing member would be equal to D2 at the upstream end of the first channel portion. This would result in a less efficient piercing member. However, the second intermediary channel portion might be omitted. In this case, the part of the piercing member with outer diameter equal to D2 would be longer or alternately, the length of first channel portion 210a would be longer so as to keep the same length of piercing member with an outer diameter of D1.

By way of example, inner diameters d1, d2 and d3 may respectively be equal to 0.6, 0.8 and 1.8 mm, D1 is equal to 1.5 mm and D2 to 2.6, the length L1 of third channel portion 210c is equal to 5 mm, and the lengths L2 and L3 are respectively of 8.9 and 12 mm. Needle element 204 is preferably made of stainless steel.

As represented in FIG. 6, the part of the piercing member with enlarged outer diameter D2 is rigid enough to be inserted into a through hole provided in support plate 80 of FIGS. 5 and 7. The protruding elements arranged on the outer surface of the piercing member will serve as retaining elements.

It is to be noted that piercing and injection unit 204 represented in FIG. 6 may be used in any other kind of beverage preparation machine where a hole or an aperture has to be formed in an ingredient capsule (e.g. in a wall thereof) and liquid has to be injected therethrough. The machine illustrated in FIGS. 1 and 2 is particularly suitable for including such a piercing and injection unit in a releasable connection or not.

However, any other types of machines with different mechanisms and geometry may be convenient.

Returning to FIG. 5, when installed unit (or needle element) 204 is arranged so as to be both flush mounted on the upper face 80a of support plate 80 and protruding from the lower face 202a of injection member 202.

The machine 200 further comprises a cleaning device 220 facing the injection member 202 and unit 204 and located above them.

As shown, cleaning device 220 is accommodated in a hollow casing 222 which is maintained in contact with the upper face 80a of support plate 80 through maintaining means. For instance, shoulders 222a and 222b formed on the outer surface of casing 222 cooperate with structural means of the extraction head 50 for maintaining casing 222 in position.

Casing 222 has a shape that is elongated along a longitudinal axis and concentrically arranged around said axis passing by the needle element traversing hole.

Casing 222 is substantially cylindrical in shape but other forms may be envisaged.

Casing 222 has a body 222a surrounding an internal elongated cavity 224 that is open at one upper end 222b of the casing for inserting therethrough cleaning device 220.

Casing 222 has at its lower end a base portion 222c. A central through hole 222d (FIG. 7) is formed in the base portion so as to permit communication between the extension of the casing and internal cavity 224. An annular recess 222e is provided in base portion 222c from underneath and surrounds hole 222d. Annular recess 22e, e.g. in the shape of an annular cylindrical portion, accommodates protruding portion 76e (ring-shaped portion) of FIG. 3 which has a tight-sealing function. Through hole 222d is aligned with the inner through channel 210 of needle element 204.

Casing 222 is also provided with at least one inlet opening enabling introduction of liquid under pressure into internal cavity 224. In the embodiment illustrated in FIGS. 5 and 7, casing 222 is provided with two distinct inlet openings 222f and 222g which each take the form of ducts protruding outwardly from the wall constituting body 222a. The ducts 222f and 222g emerge through the wall into internal cavity 224.

As depicted in FIGS. 5 and 7, both ducts are located on the same side of the casing above the central portion of support plate 80 so as not to increase the overall size of the assembly (injection member 202 and casing 222 enclosing the cleaning device).

Further, one of the ducts is arranged above the other. One of the ducts is used for hot liquid (e.g. water) whereas the other is used for liquid (e.g. water) at ambient temperature. These ducts are in communication with pump 20 (FIG. 1) through a liquid circulation system including e.g. flexible pipes.

Cleaning device 220 includes a support member 226 that is movable along the longitudinal axis of the casing 222 between two main positions as schematically illustrated in FIG. 5 and FIG. 7. More particularly, support member 226 is slidable within internal elongated cavity 224 through a guiding member 228. The latter has, for instance a ring shape with a central hole for being mounted around the longitudinally-shaped support member 226. Guiding member 228 is provided with traversing holes enabling passage of liquid therethrough. Furthermore, guiding member is adjusted around support member 226 in a zone where the support member has a shoulder due to a reduced section. The external diameter of guiding member 228 fit the dimensions of internal cavity for sliding purpose.

Support member 226 protrudes from casing 222 at its upper end. A closing member 230 closes the open upper end of casing 222 and is provided with a central inner hole for receiving therein support member 226 and enabling sliding movement of the latter therethrough. The closing member is e.g. a flange with an inner peripheral seal (e.g. an O-ring, Quad-ring, Double Delta seal, etc) in contact with support member 226. The closing member is mounted on the casing in a secured and releasable known manner.

Cleaning device 220 also includes an elongated cleaning member 232 that is connected to support member 226 and therefore moves with the latter.

Elongated cleaning member 232 may be releasably connected to an end of the support member or permanently secured thereto by one end, the opposite elongated cleaning member end being free. For instance, member 232 is connected to an end of support member 226 which has a reduced section. This reduced section portion fits the dimensions of through hole 222d (FIG. 7).

Support member 226 and elongated cleaning member 232 are in alignment.

Elongated cleaning member 232 may, for instance, take the form of a pin.

Elongated cleaning member 232 has a shape and outer dimensions (outside diameter of e.g. 0.5 mm) which respectively fit the shape and internal dimensions (e.g. internal diameter(s)) of the inner through channel 210 and, in particular, of the smallest channel portion thereof.

Thus, cleaning member 232 is able to follow a back and forth motion within channel 210, in particular, first channel portion 210a, in the course of use of the machine for cleaning purpose.

As illustrated in FIGS. 5 and 7, the support member 226 has two opposed ends: one end 226a is connected to elongated cleaning member 232 while the other opposed end 226b is connected to a fixed part of the machine through a linking mechanism.

In particular, the opposed end 226b is connected to a shaft 234 (or pin member) which is freely mounted in translation within guiding means 236 such as a rail member or slot. The guiding means are closed or equipped with two stops at their two opposed ends which define the ends of the path traveled by shaft 234.

As shown, guiding member 236 is inclined with respect to horizontal and vertical lines so as to be adapted to follow the substantially circular (along a portion of a circle) downward movement of the injection unit.

For instance, the opposed end 236b is freely rotatably mounted in rotation about shaft 234 that is arranged perpendicularly to support member 226 and slidably engages guiding member 236.

Guiding means 236 are provided in a carrier 238 which is fixedly connected to the chassis of the beverage preparation machine. For instance, carrier 238 may take the form of an inverted U with the horizontal part being represented in cross-section in the drawings and the two vertical descending arms which are fixed to the chassis being hidden Guiding means 236 are for example made integral with the horizontal part of carrier 238.

As represented in FIG. 5 (machine in the open position), the extraction head 50 including the assembly comprising the injection unit and the cleaning device is in a high position waiting for introduction of an ingredient capsule into the machine. In this position, the support member 225 is in a lower position (guiding member 228 rests against the bottom of internal cavity 224) and the elongated cleaning member is fully inserted into channel 210 so that its extremity 232a extends through the free emerging end 210d of the channel (first active position of elongated cleaning member). In the meantime, the shaft 234 is arranged at one end of guiding means 236, in the upper part thereof, and in contact with a stop end of guiding means.

When an ingredient capsule has been introduced in the machine by a user, the machine can be closed (FIG. 1 position). More particularly, closing of the machine is obtained through actuating the closing mechanism 52 from position represented in FIG. 2 (and FIG. 5) to FIG. 1 position (and FIG. 7).

In the course of actuating the machine from FIG. 5 position to FIG. 7 position, shaft 234 slides into guiding member 236 (e.g. rail member or slot) down to the opposite stop end thereof.

This arrangement acts as retaining means for retaining the support member 226, while the injection unit (more particularly, the injection member 202, support 60 and casing 222) keeps on moving downwardly to reach the closed position in FIG. 7.

Thus, since the support member 226 is refrained from moving further downwards the elongated cleaning member 232 connected thereto is also retained in an upper position and, therefore, is partly withdrawn from channel 210.

As illustrated in FIG. 7, member 232 is withdrawn from first and second channel portions 210a and 210b so that its free extremity is located in the third channel portion (second rest position). This makes it possible in this position for liquid to be successively introduced through one of the ducts 222f and 222g, internal cavity 224, through hole 222d and inner channel portions 210c, 210b, and 210a before exiting through outlet orifice 210a under the form of a jet. The jet is injected into the ingredient capsule.

Thanks to the internal configuration of the injection unit represented in FIG. 6 it is possible to only withdraw elongated cleaning member 232 in part from the inner through channel 210.

This is advantageous since the path to be traveled by member 232 and support member 226 is therefore of reduced length compared to that necessary for fully removing member 232 from the channel.

Thus, this reduced path which corresponds to the path traveled by shaft 234 within guiding means 236 can be easily housed in the machine without modifying the external size thereof.

When thus actuating the machine from FIG. 5 position to FIG. 7 position and vice versa, the elongated cleaning member 232 slides within channel 210 and, in particular, within first channel portion 210a which is the most susceptible of being clogged by debris, deposits such as scaling deposits.

The sliding movement enables removal of any deposits that may get accumulated on the inner surface of the wall defining the channel portion.

When the machine is actuated for being opened from FIG. 7 position to FIG. 5 position the reverse movement of the support member and elongated cleaning member with respect to the injection unit occurs. The elongated cleaning member then is introduced in the second and first channel portions for cleaning thereof after liquid circulated within these channel portions. It is to be noted that this cleaning device and associated mechanism are particularly reliable. Furthermore, cleaning takes place twice at every cycle of use of the machine since the latter is opened twice, for introducing a capsule and removing it.

It is to be noted that the ingredient capsule 54 contains food ingredients or substances that are used by addition of a liquid, e.g. water, for preparing a beverage or, to a larger extent, liquid comestibles.

Such ingredients may be coffee, e.g. roasted and grounded coffee.

Other ingredients include, in a non limitative way, tea (leaf tea, herbal tea or fruit tea), soluble tea or soluble coffee, a mixture of ground coffee and soluble coffee, cocoa, or a cocoa or chocolate-based or supplemented product including coffee, a soup, or foods such as in the form of infusions, for example.

It is to be noted that any ingredient capsule may be used and for instance open capsules such as filter pods or the like.

As a variant, it is possible to design an injection member having more than one needle element which may be connected by a means of a duct or the like.

The pattern and design of these needle elements may vary in order to meet different requirements regarding the injection conditions of the beverages to be prepared. In particular, the injection conditions may vary especially with regard to the dissolution and/or extraction of the substances provided within the ingredient capsules 54.

It should be understood that various changes and modifications to the presently preferred embodiments described herein will be apparent to those skilled in the art.

Such changes and modifications can be made without departing from the spirit and scope of the present invention and without diminishing its attendant advantages. It is therefore intended that such changes and modifications be covered by the appended claims.

The invention claimed is:

1. A beverage system for preparing a beverage by injecting a liquid into an ingredient capsule, the beverage system comprising:
   an ingredient capsule; and
   a beverage preparation machine comprising (1) an injection unit with at least one inner through channel for injecting a liquid into the ingredient capsule, (2) an operating member for causing the machine to prepare a beverage, (3) a cleaning device for automatically cleaning the at least one inner through channel, the cleaning device being actuated by the operating member, the cleaning device having an elongated cleaning member, and actuation of the cleaning device causing the elongated cleaning member to slide within the at least one inner through channel, and (4) a hollow casing containing a support member to which the cleaning member is attached, the support member connected to the casing by a spring secured at one end to the support member and at an opposite end to a closing member of the casing, wherein the elongated cleaning member is able to automatically occupy two positions, a first active position in which the elongated cleaning member extends within the at least one inner through channel through to a free emerging end thereof, and a second rest position in which the elongated cleaning member is at least partly withdrawn from the at least one inner through channel.

2. The beverage system according to claim 1, wherein the at least one inner through channel comprises at least two channel portions, a first channel portion including the free emerging end of the at least one inner through channel and having a first inner diameter, and at least one upstream channel portion located upstream the first channel portion and having an enlarged second inner diameter.

3. The beverage system according to claim 2, wherein the elongated cleaning member has a free extremity which, in the second rest position, is located in the at least one upstream channel portion.

4. The beverage system according to claim 2, wherein the elongated cleaning member has an outside diameter which substantially fits the first inner diameter of the first channel portion while enabling sliding of the elongated cleaning member thereinto.

5. The beverage system according to claim 1, wherein the operating member comprises an actuator for actuating the machine from a first open position in which the machine is open for enabling introduction of the ingredient capsule thereinto to a second closed position in which the machine is closed and the ingredient capsule is inside the machine for liquid injection, and for actuating the machine from the second closed position to the first open position, the cleaning device being actuated by the actuator.

6. The beverage system according to claim 5, wherein the elongated cleaning member and the injection unit are movable relative to one another when the machine is actuated from the first open position to the second closed position and when the machine is actuated from the second closed position to the first open position.

7. The beverage system according to claim 6, wherein the cleaning device has a support member to which the elongated cleaning member is connected, the support member being movable relative to the injection unit over a reduced path so that the elongated cleaning member is only withdrawn in part from the at least one inner through channel in the second position.

8. The beverage system according to claim 7, wherein the support member has two opposed ends, one end being connected to the elongated cleaning member and the other opposed end being linked with a guide which is connected to the machine, the other opposed end being slidably guided over the reduced path when the machine is actuated from the first open position to the second closed position, and when the machine is actuated from the second closed position to the first open position.

9. The beverage system according to claim 1, wherein the machine has:
   a liquid source,
   a pump for pumping the liquid from the liquid source towards the injection unit, and
   an activating member for causing the liquid to be pumped from the source towards the injection unit, the cleaning device being actuated by the activating member.

10. The beverage system according to claim 5 comprising a hollow casing containing a support member to which the cleaning member is attached, the support member connected to the casing by a spring secured at one end to the support member and at an opposite end to a closing member of the casing, wherein the elongated cleaning member is able to automatically occupy the first open position and the second closed position depending on the injection or not of liquid into the at least one inner through channel, the elongated cleaning member being in the first open position in the absence of liquid injection thereinto, the elongated cleaning member being in the second closed position due to the pressure of liquid injected into the at least one inner through channel.

11. The beverage system according to claim 10, wherein the spring exerts upon the elongated cleaning member a first predetermined force so as to urge the elongated cleaning member to be inserted into the at least one inner through channel with a view to occupying the first active position, the elongated cleaning member being able to be pushed backwards under the action of the pressure of the liquid to be injected into the at least one inner through channel and which counteracts the first predetermined force so that the elongated cleaning member is at least partly withdrawn from the at least one inner through channel.

12. The beverage system according to claim 1, wherein the beverage preparation machine includes a capsule-holder for holding the ingredient capsule.

13. The beverage system according to claim 1, wherein the support member comprises a base portion to which the cleaning device is attached, a body portion axially extending from the base portion, and a radial extension that forms a shoulder of the body portion.

14. The beverage system according to claim 13, wherein the shoulder has the same diameter as a cavity of the casing, and the portion of the support member below the shoulder has a narrower diameter than the shoulder.

* * * * *